United States Patent
Okimoto

(10) Patent No.: US 6,198,541 B1
(45) Date of Patent: Mar. 6, 2001

(54) CONTROL UNIT OF IMAGE FORMING DEVICE

(75) Inventor: Satoshi Okimoto, Komaki (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/192,281

(22) Filed: Nov. 16, 1998

(30) Foreign Application Priority Data

Nov. 14, 1997 (JP) .................................................. 9-313620

(51) Int. Cl.[7] .................................................. G06K 15/00
(52) U.S. Cl. .......................................... 358/1.14; 358/1.15
(58) Field of Search .................................... 395/114, 115, 395/101; 358/468, 401, 404, 444, 471, 479, 1.15, 1.14

(56) References Cited

U.S. PATENT DOCUMENTS

| | | | |
|---|---|---|---|
| 5,579,522 | * 11/1996 | Christeson et al. | 395/652 |
| 5,604,917 | * 2/1997 | Saito | 395/869 |
| 5,684,864 | * 11/1997 | Shibata | 379/96 |
| 5,883,842 | * 3/1999 | Miyauchi | 365/200 |
| 5,894,312 | * 4/1999 | Ishiwata et al. | 345/504 |

* cited by examiner

Primary Examiner—Jerome Grant, II
(74) Attorney, Agent, or Firm—Oliff & Berridge, PLC

(57) ABSTRACT

An image forming device including a memory for storing image data. The memory is prohibited from erasing the image data undesirably. When a user transmits the image data from a computer to the image forming device so as to obtain a plurality of copies of a document the image forming device, first, provides a first copy of the document. Also, the image data is stored in the memory. At this time, the image data is prohibited from being erased. Then, when the user wishes to obtain the rest of the copies, the user presses a continue key. On the other hand, when the user wishes not to obtain the rest of the copies, the user presses a cancel key. Then, the image data is allowed to be erased. When a predetermined time duration elapses without neither the continue key nor the cancel key is pressed, the image data is allowed to be erased.

19 Claims, 6 Drawing Sheets

CONTROL UNIT OF IMAGE FORMING DEVICE

BACKGROUND OF THE INVENTION

1. Field of the Invention

The present invention relates to a control unit of an image forming device for printing images based on print data, and more specifically to a control unit including a memory for storing print data even after the images are printed out.

2. Description of Related Art

There has been provided a system including a plurality of personal computers and a printer communicable with each other via a local area network (LAN) including a host computer. This kind of system is being used in an increasing number of companies. Because, in this kind of system, users of the personal computers can share a single printer, costs of office equipment can be reduced, and also space taken up by the equipment in the office can be saved.

However, In this case, some personal computers may be located a fair distance from the printer. When a user of such personal computer wishes to print out a document, the user operates an input unit of the personal computer to transmit print data to the printer, and then, walks to the printer to fetch the document. After the user examines and approves contents of the document, the user may wish to obtain additional copies of the document. In this case, the user needs to walk back to the personal computer to again transmit the print data to the printer.

There has been also proposed an image forming device including a memory for storing print data transmitted from an external device. The print data is stored in the memory without being erased at least until an image is formed based on the print data.

When this kind of printer is provided in the above described system, the same image can be repeatedly formed as long as the print data is stored in the memory. Therefore, the user needs not walk back to the personal computer to again transit the print data when the user wishes to obtain the additional copies of the document.

However, when an other user transmits different print data to the printer, the current print data in the memory is replaced by the different print data. That is, the current print data may be erased while the user is examining the contents of the document. Then, when the user wishes to obtain additional copies of the document, the user needs to go back to the personal computer to again transmit the print data.

It is conceivable to print out a plurality of copies of the document from the beginning without examining the contents of the document. However, in this case, if the user finds errors in the contents, all copies will need to be disposed. This means that the user wastes time for printing out copies of flawed and undesirable document. Also, the recording media used for these copies is also wasted.

SUMMARY OF THE INVENTION

It is an objective of the present invention to overcome the above-described problems and to provide an image forming device capable of preventing print data from being erased undesirably.

In order to achieve the above and the other objectives, there is provided an image forming device communicable with an external device. The image forming device includes a memory, image forming means, first control means, and second control means. The memory stores image data transmitted from an external device. The image forming means forms an image on a recording medium based on the image data so as to provide at least one copy of a document. The first control means prohibits the memory from erasing the image data. The second control means allows the memory to erase the image data. The first control means prohibits the memory from erasing the image data until the second control means allows the memory to erase the image data.

There is also provided an image forming device communicable with an external device. The image forming device includes a memory, image forming means, first control means, second control means, and an input unit. The memory stores image data transmitted from an external device. The image forming means forms an image based on the image data to provide at least one copy of a document. The first control means prohibits the memory from erasing the image data. The second control means allows the memory to erase the image data. A user input a next command through the input unit. After the image forming means has provided a first one of a plurality of copies of the document, the image forming means provides rest of the plurality of copies when the next command is input by the user. The second control means allows the memory to erase the image data when the image forming means provides the rest of the plurality of copies.

BRIEF DESCRIPTION OF THE DRAWINGS

The particular features and advantages of the invention as well as other objects will become more apparent from the following description taken in connection with the accompanying drawings, in which.

DETAILED DESCRIPTION OF THE PREFERRED EMBODIMENTS

An image forming device according to a preferred embodiment of the present invention will be described while referring to the accompanying drawings.

In the present embodiment, a print system including a printer as an image forming device of the present invention will be described.

Figure 1:
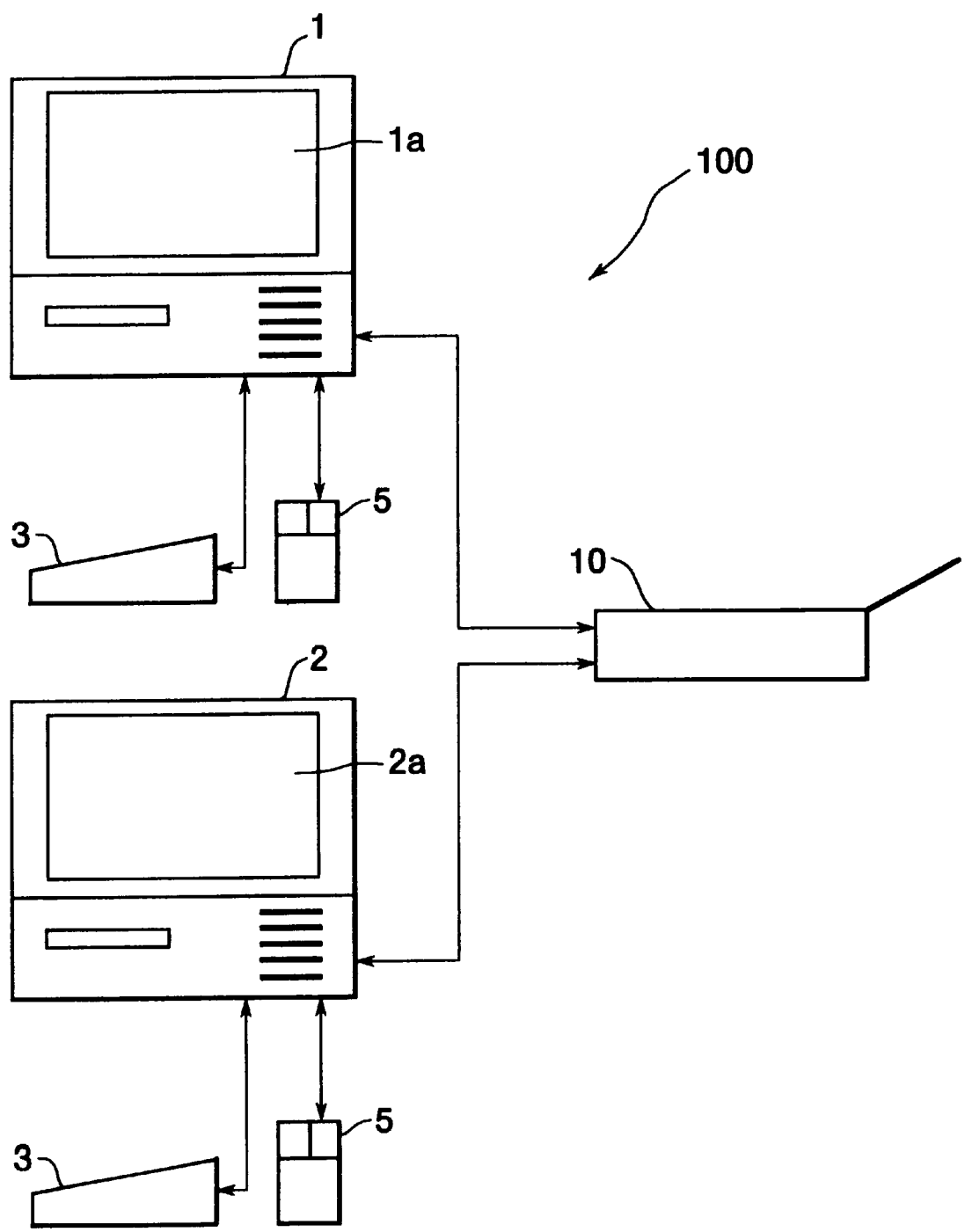
FIG. 1 is a configuration of print system including an image forming device according to an embodiment of the present invention.

First, a configuration of a print system 100 will be described while referring to FIG. 1. As shown in FIG. 1, the print system 100 includes a first host computer 1, a second host computer 2, and a printer 10. Each of the first and second host computers 1, 2 includes a keyboard 3 and a mouse 5. Although not shown in the drawings, each of the host computers 1, 2 further includes a central processing unit (CPU), a read only memory (ROM), and a random access memory (RAM). The first and the second host computers 1, 2 are individually connected to the printer 10 via a local area network (LAN). Although not shown in the drawings, the LAN includes a server, so that the first and the second host computers 1, 2 communicate with the printer 10 via the server. Print data is generated on the host computes 1, 2 and transmitted to the printer 10 to be printed out. It should be noted that in the present embodiment the print system 100 includes only two host computers, that is, the first and the second host computers 1, 2. However, the print system 100 can include more than two host computers.

Figure 2:
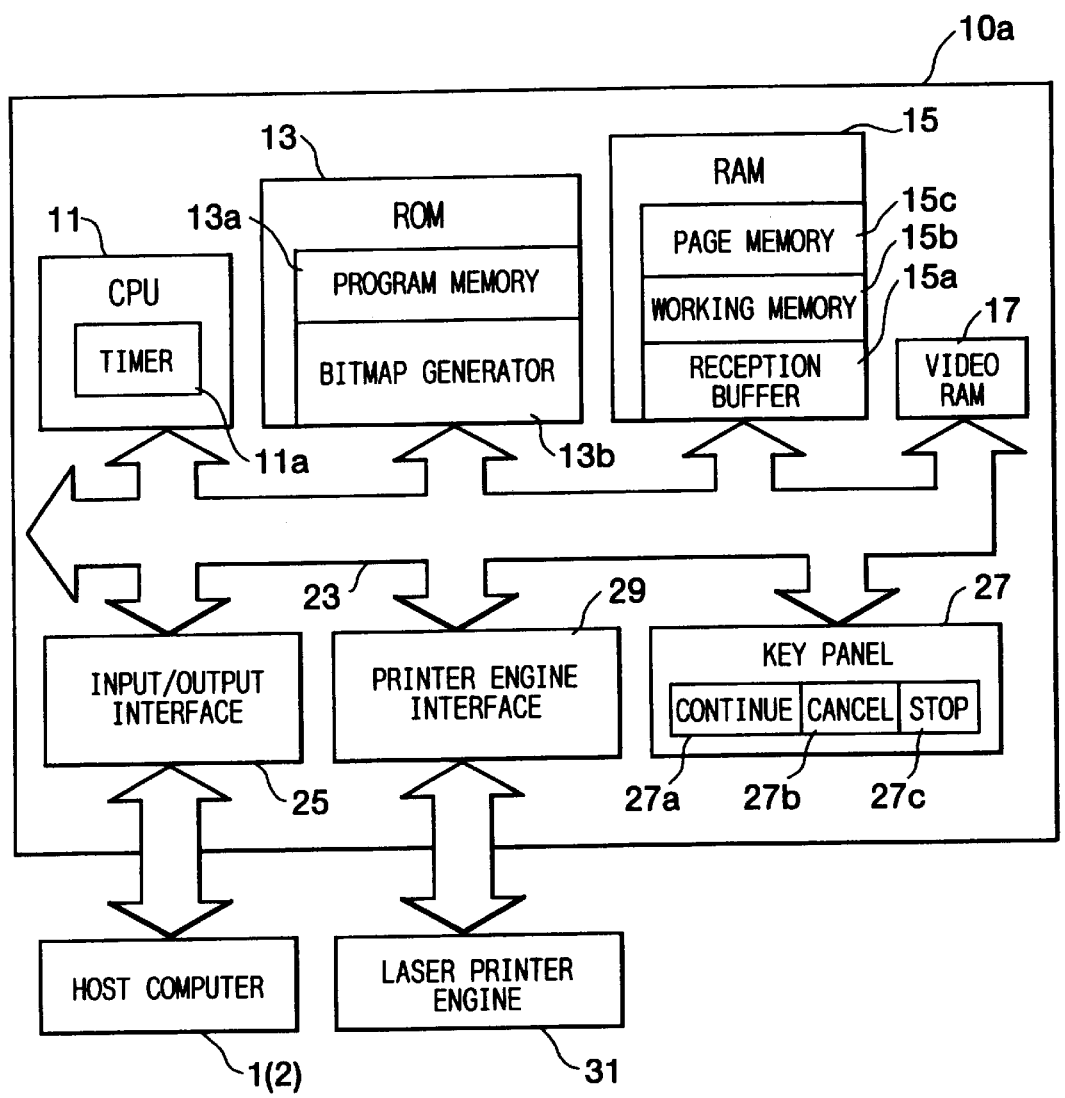
FIG. 2 is a block diagram showing a control system of the image forming device of FIG. 1.

Next, a control unit 10a of the printer 10 will be described while referring to FIG. 2. As shown in FIG. 2, the printer 10 includes the control unit 10a and a laser printer engine 31. The control unit 10a includes a CPU 11, a ROM 13, a RAM 15, a video RAM 17, an input/output interface 25, a printer-engine interface 20, and a key panel 27, each connected to each other via a bus 23. The CPU 11 includes a timer 11a and controls overall operation of the printer 10. The timer 11a measures a time duration based, on a clock signal. The ROM 13 includes a program memory 13a and a bitmap generator 13b. The program memory 13a stores programs, and the bitmap generator 13b generates bitmap video data from interim data stored in a page memory 15c (described later).

Interim data may be compressed data or command data. The compressed data may be bitmap data compressed with respect to each scanning line or each block of a predetermined number of bits. Also, the command data may include a pointer indicating storing location of various kinds of character data and a location data designating an image forming location on a recording medium on which a selected character is formed based on the character data.

It should be noted that when character data is not stored in a memory of a printer, compressed bitmap print data is usually generated by a printer driver of a host computer, and then, the print data is transmitted to the printer. On the other hand, when character data is stored in a memory of a printer, print data including character codes and control codes is transmitted to the printer. Then, command data is generated from the print data in the printer. In either case, interim data should be in a preferable form so that a print mechanism, that is, the laser printer engine 31 in the present embodiment, can generate print output data. such as video data, from the interim data in a predetermined time duration. Also, interim data should be storable in a memory without consuming excessive memory capacity of the memory.

The RAM 15 includes a reception buffer 15a, a working memory 15b, and the page memory 15c. The reception buffer 15a temporarily stores data, such as print data, transmitted from the first and second host computers 1, 2. The working memory 15b stores flags for use in executing the programs stored in the program memory 13a. The page memory 15c stores interim data along with corresponding position data. The interim data is generated from each page's worth of print data stored in the reception buffer 15a.

It should be noted that the printer 10 may receive interim print data rather than print data from the first and the second host computers 1, 2. In this case, the received interim print data is directory stored in the page memory 15c via the reception buffer 15a.

The printer 10 is communicable with the host computers 1, 2 via the input/output interface 25. The key panel 27 includes a continue key 27a, a cancel key 27b, a stop key 27c, and other keys (not shown). The user inputs commands using the key panel 27. The printer-engine interface 19 includes a driving circuit (not shown) and is connected to the laser printer engine 31. The laser printer engine 31 is controlled by the control unit 10a. Because the laser printer engine 31 has a well-known mechanism, detailed descriptions of the laser printer engine 31 will be omitted.

Figure 3:
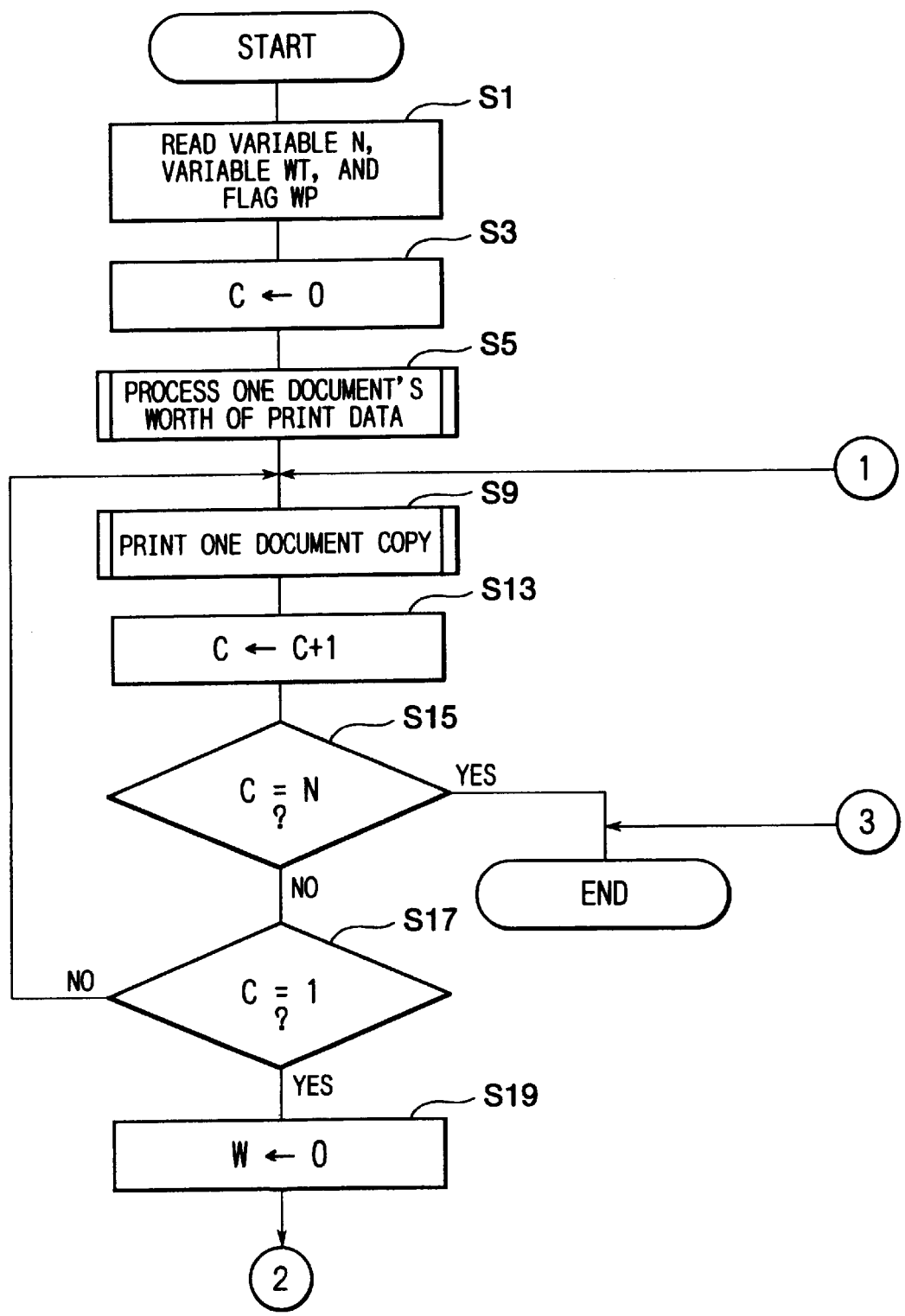
FIG. 3 is a flowchart representing a section of a main routine executed by the image forming device of FIG. 1.
Figure 4:
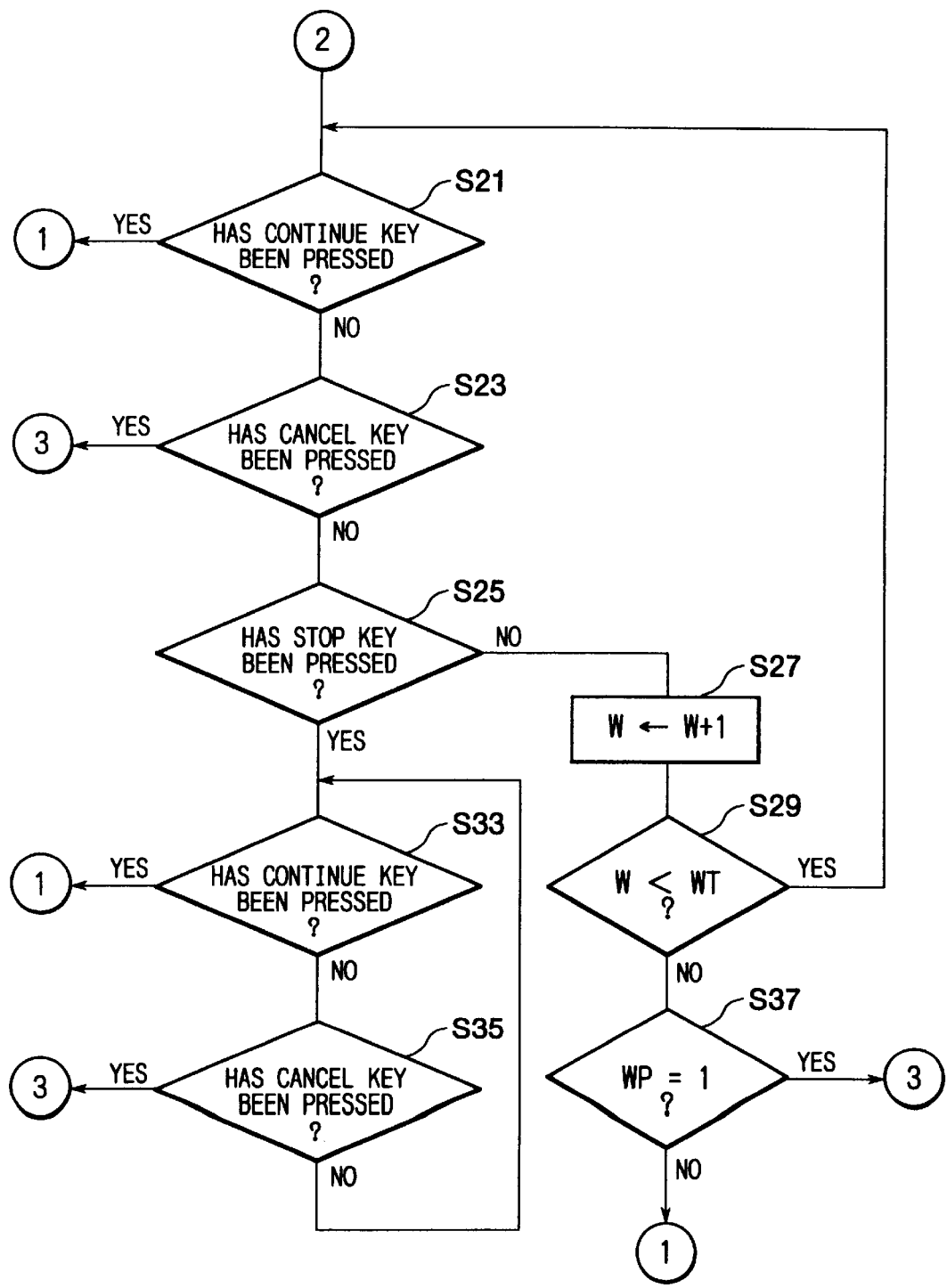
FIG. 4 is a flowchart representing an other section of the main routine executed by the image forming device of FIG. 1.

Next, a main routine executed by the control unit 10a for controlling the laser printer engine 31 will be described while referring to the flowchart shown in FIG. 3. The main routine is started when print data is received from either the first host computer 1 or the second host computer 2. However, in this example, it is assumed that print data is received from the first host computer 1.

The print data generated by and transmitted from the first host computer 1 includes a header including variables N, WT, and a flag WP. The variable N indicates total number of copies of a document to be printed out. The variable WT indicates a waiting time duration. The waiting time duration is a time limit for the user to examine the contents of the document after a first copy is printed out. The flag WP indicates a subsequent print process to be executed after the waiting time duration elapses. Detailed explanations for the variables N, WT, and the flag WP will be provided later.

Figure 5:
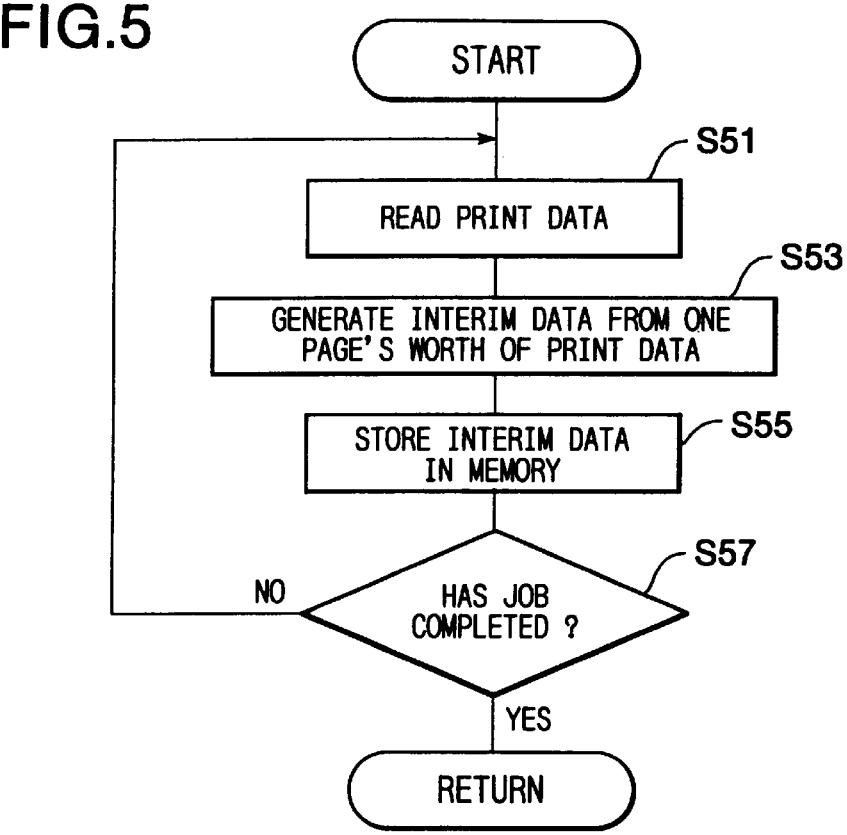
FIG. 5 is a flowchart representing a data process routine executed in S4 of the flowchart of FIG. 3.

When the main routine is started first in S1, the variables N, WT and the flag WP are detected from the header of the print data and stored in the reception memory 15a of the RAM 15. Next, in S3, a value of a copy counter C is initialized to zero. Then, in S5, a data process routine is executed for one document's worth of print data. The data process routine is represented by the flowchart shown in FIG. 5. When the data process routine is started, first in S51, the print data is detected. Next, in S53, interim data is generated from one page's worth of the print data, and then in S55, the interim data is stored in the page memory 15c of the RAM 15. Next, it is determined in S57 whether or not interim data for the entire subject document Is stored in the page memory 15c. If not (S57:NO), the program returns to S51. On the other hand, if so (S57:YES), the data process routine is ended. and the program proceeds to S9 of the main routine.

Figure 6:
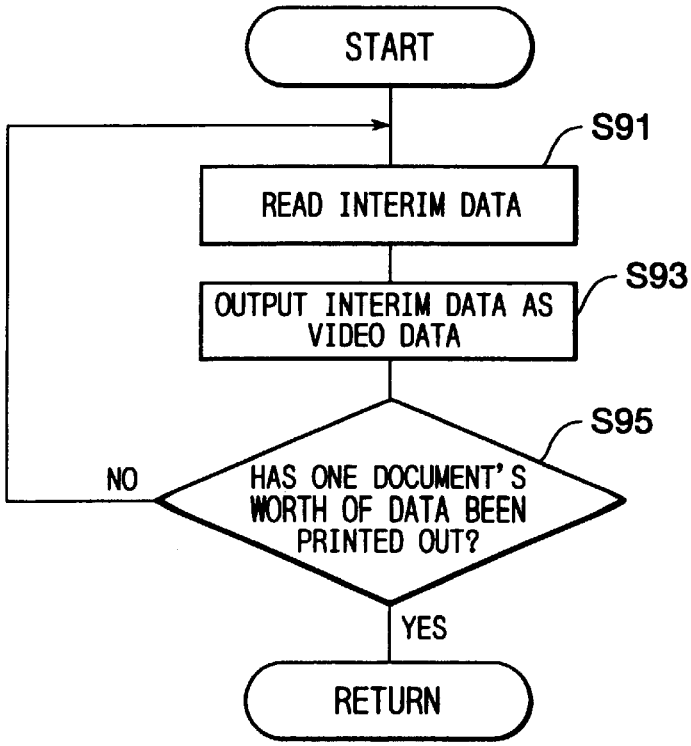
FIG. 6 is a flowchart representing a print routine executed in S9 of the flowchart of FIG. 3.

In S9, a print routine is executed to print one document copy based on the interim data. The print routine is represented by the flowchart shown in FIG. 6. When the print routine is started, first in S91, the interim data is read from the page memory 15c. Next, in S93, video data is generated from the interim data and output to the laser printer engine 31. When the laser printer engine 31 receives the video data, an image corresponding to the print data is formed on a recording medium based on the video data. It should be noted that data processing speed in S91 and S93 should be set in accordance with a memory capacity of the video RAM 17 and data process speed of the laser printer engine 31. Then, it is determined in S95 whether or not the one document copy has been printed out. If not (S95:NO), the program returns to S91. On the other hand. if so (S95:YES), the print routine is ended, and the program proceeds to S13 of the main routine.

In S13, the value of the copy counter C is incremented by one. Then, it is determined in S15 whether or not the value of the copy counter C is equal to the variable N. If not (S15:NO), the program proceeds to S17. If so (S15:YES), the present routine is ended. That is, when the variable N is 1, the program is ended without executing S17 or subsequent processes. That is, S17 and subsequent processes will only be executed when the variable N is equal to 2 or greater. In this cases in S17, it Is determined whether or not the value of the copy counter C is equal to 1. If not (S17:NO), the program returns to S9. If so (S17:YES), the program proceeds to S19. That is, S17 will result in an affirmative determination only after the first one of a plurality of document copies is printed out. As a result, if the variable N is set to a value equal to or greater than 2, then after a first document copy has been printed out in S9 (S95:YES), S15 will result in a negative determination (S15:NO), and S17 will result in an affirmative determination (S17:YES). Then, the program proceeds to S19. In S19, a value of a time counter W is initialized to be zero. Then, it is determined in S21 whether or not the continue key 27a is pressed. If not (S21:NO), the program proceeds to S23 wherein it is determined whether or not the cancel key 27b is pressed. If not (S23:NO), the program proceeds to S25, whereupon It Is determined whether or not the stop key 27c is pressed. If not (S25:NO), then in S27, the value of time counter W is incremented by one. Next, it is determined in S29 whether or not the value of the time counter W is smaller than the variable WT. That is, it is determined whether or not the waiting time duration has elapsed. If the time counter W is smaller than the variable WT (S29:YES), the program returns to S27. That is, the processes in S21, S23, S25, S27, and S29 (hereinafter referred to as "first loop processes") are repeatedly executed until one of the continue key 27a, the cancel key 27b, and the stop key 27c is pressed or the value of the time counter W becomes equal to or greater than the variable WT.

While the first loop processes are executed after the first copy of the document is printed out, the user walks to the printer 10 to receive the first copy. Then, the user examines the document. If the user finds the document to be acceptable, the user presses the continue key 27a before the waiting time duration elapses. When the continue key 27a is pressed by the user, S21 results in an affirmative determination (S21:YES). Then, the process proceeds to S9 and a second copy is printed out. Then in S13, the value of the copy counter C is incremented by one. When the variable N is greater than 2, S15 and S17 result in negative determinations (S15:NO, S17:NO), and the program returns to S9. In this way, printing operations are executed N times. After all N copies of the document are printed out, S15 results in an affirmative determination (S15:YES), and the program is ended.

While the above-described program is executed, the control unit 15a retains the print data in the page memory, that is, prohibits the print data in the page memory 15c from being erased. Therefore, even if another user transmits different print data, the current print data will not be replaced by the different print data. In this way, the print data can be prevented from being erased undesirably after the first copy of the document is printed out. Then, after the program is ended, the control unit 15a stops protecting the print data so that subsequent print data can replace the current print data. That is, the print data can be erased.

When the user finds errors in the document while examining the first copy, or when the user wishes to retransmit the print data for some reason, the user presses the cancel key 27b before the waiting time duration elapses. When the user presses the cancel key 27b while the first loop processes are being executed, S23 results in an affirmative determination (S23:YES). Then, the program is ended without printing out rest of the copies. In this way, second to Nth copies will not be printed out. Therefore, unnecessary printing operations can be prevented from being executed.

When the user needs more time than the predetermined waiting time duration to examine the contents of the document, the user presses the stop key 27c before the waiting time duration elapses. When the stop key 27c is pressed, S25 results in an affirEmative determination (S25:YES). Then, the program proceeds to S33. In S33, it is determined whether or not the continue key 27a is pressed. If not (S33:NO), then it is determined in S35 whether or not the cancel key 27b is pressed. If not (S35:NO), the program returns to S33. That is, the processes in S33 and S35 (hereinafter referred to as second loop processes) are repeatedly executed until either the continue key 27a or the cancel key 24b is pressed. While the second loop processes are executed, the print data is prevented from being erased regardless of passing of time. Therefore, the user can take his or her time to examine the contents of the document as much as need.

Then, if the user wishes to obtain the rest of the copies after examining the contents, the user presses the continue key 27a. When the continue key 27b is pressed while the second loop processes are being executed, S33 results in an affirmative determination (S33:YES). Then, the process proceeds to S9 and second to Nth copies are printed out. On the other hand, if the user wishes not to obtain the rest of the copies, the user presses the cancel key 27b. S35 results in an affirmative determination (S35:YES), and the program is ended. Because the print data is no longer protected from being erased, different print data can replace the print data.

If, while the first loop processes are executed, the waiting time duration elapses, that is, if it is determined in S29 that the value of the time counter W is not smaller than the variable WT without any of the continue key 27a, the cancel key 27b, and the stop key 27c being pressed, S29 results in a negative determination (S29:NO). Then, the program proceeds to S37 wherein It is determined whether the value of flag WP is 1.

If so (S37:YES), the program is ended and the print data is allowed to be erased. That is, if the waiting time duration elapses without any key being pressed after the first copy is printed out, the protection on the print data is automatically cancelled without printing out the rest of the copies. If the unnecessary print data is retained in the RAM 15 for a long time, a user of the second host computer 2 cannot use the printer 10. However, in the present embodiment, the print data is prevented from being retained unnecessarily in the RAM 15 as described above. Therefore, such problem will not be caused.

On the other hand, if it is determined in S37 that the value of the flag WP is not equal to 1 (S37:NO), the program returns to S9 to automatically print out the rest of the copies. Therefore, even if the user forgets to press the continue key 27a or even if the control unit 10a failed to detect that the continue key 27a being pressed, the rest of the copies will be printed out. Therefore, all copies can be reliably and easily printed out. Further, after all copies are printed out (S15:YES), the program is ended and the print data is no longer prevented from being erased. Therefore, the print data will not be retained unnecessarily, thereby allowing a subsequent printing operation to be performed. In this way, the user can operate the printer 10 in a simple manner to operate.

The value of the flag WP, that is, processes after S35, can be selected by the user. For example, the user may or may not want to confirm contents of the document after printing. When the user want to, the user can set the flag WP to 1. Then, If the user finds an error in the document, the print data will be no longer prevented from being erased without requiring the user to further operate on the key panel 27. In this way, because unnecessary printing operations are prevented, wasting of time and wasting of recording media can be avoided. On the other hand, when the user does not want to examine the contents of the document, the user can set the flag WP to zero. In this case, rest of the copies of the document will be automatically printed out without the user further operating on the key panel 27. Therefore, the rest of the copies can be reliably and easily printed out.

As described above, when the user attempts to obtain a plurality of copies of a document, the user can examine a first copy without worrying about print data being erased by different print data. Also, when the user approves the document, the user can obtain rest of the copies reliably and easily.

Also, in the above-described embodiment, it is determined based on the variable N whether or not print data should be prevented from being erased after a first copy is printed out. That is, when the variable N is equal to or greater than 2, print data is prevented from being erased. The variable N is included in a header of the print data. Because the header of the print data is stored in the reception buffer 15a at substantially the same time with the print data, the print data can be further reliably prevented from being undesirably erased by replacement.

Further, after the first copy is printed out, the rest of the copies will not be printed out unless continue key 27a is pressed or the waiting time duration elapses. Therefore, the user can examine the document before printing out all the copies. In this way, undesired copies can be prevented from being printed out. This prevents wasting the user's time and recording media.

The variable WT, that is, the waiting time duration can be set by the user by operating on the first host computer 1. Therefore, when a document is large and difficult or complicated, the user can set a relatively greater variable WT. Further, by pressing the stop key, 27c, the user can increase the waiting time duration as long as necessary. Therefore, the user can thoroughly examine the document without worrying about a time limit.

While the invention has been described in detail with reference to specific embodiments thereof, it would be apparent to those skilled in the art that various changes and modifications may be made therein without departing from the spirit of the invention, the scope of which is defined by the attached claims.

The key panel 27 can further include an alarm lamp or a display unit for notifying the user that the second loop processes are presently being executed so that the user will not forget to press either the continue key 27a or the cancel key 27b.

Further, the user of the second host computer 2 may wish to use the printer for obtaining a different document while the second loop processes are being executed. To accommodate such a situation, the printer 10 can be designed to transmit to the second host computer 2 a status signal indicating that the second loop processes are presently being executed, so that the second host computer 2 cannot use the printer 10. The host computer 2 can be designed to display based on the status signal from the printer 10 on the display 2a a message notifying the user of the status of the printer 10.

The control unit 10a can further include a reprint function. More specifically, in the above-described embodiment, unnecessary print data is retained in the page memory 15c unless replaced by other print data. As long as the print data is stored in the page memory 15c, the print data can be repeatedly printed out. Alternatively, unnecessary print data can be automatically erased once the program of the main routine is ended.

Also, the page memory 15c can be provided with a relatively large memory capacity so that more than one set of print data can be stored in the page memory 15c. In this case while the first loop processes are being executed with respect to print data from the first host computer 1. different print data transmitted from the second host computer 2 can also be stored in the page memory 15c. Then, the control unit 10 can execute the above-described processes for the different print data even before the processes on the prior print data have been completed.

Specifically, when the stop key 27c is pressed in S25, data (hereinafter referred to as "JOB data") on a variety of printing conditions set for the current print data is transferred to and stored in a predetermined area of the RAM 15. The address where the current print data is stored in the page memory 15c is also stored in the predetermined area. These transferring processes are collectively called a PUSH process. Then, a flag is set to indicate that the JOB data is stored in the predetermined area. Then, the program is executed for the different print data from the host computer 2. This process is called an interruption process.

When, after examining a first copy of a document, the user wishes to execute printing of the rest of the copies while the program is presently executed for the different print data, the user presses the continue key 27a. When the continue key 27a is pressed, an interrupting signal is output to the CPU 11 to notify the CPU 11 that the continue key 27a has been pressed. Then, the CPU 11 detects the JOB data in the predetermined area based on the flag. The CPU 11 sets the printing processes based on the JOB data, and executes the printing operation for the rest of the copies based on the address in the page memory 15c. These processes are called a POP operation. On the other hand, when the user wishes not to print out the rest of the copies, the user presses the cancel key 27b. Then, an interrupting signal is output to notify the CPU 11 that the cancel key 27b has been pressed. The CPU 11 designates that the data stored where the JOB data and the address of the page memory 15c are stored at the address of the page memory 15c can be erased.

In this way, the interrupting program for different print data may be executed when the stop key 27c is pressed. The above described PUSH process can also be executed directly after the first copy is printed out when the user sets a relatively long-waiting time. Alternatively, the POP process can be executed either when the continue key 27a is pressed or after the waiting time duration elapses.

In this way, while the user is examining contents of the document before printing out the rest of the copies, the printer 10 can execute the printing operation for different print data. Therefore, the printer 10 can be used by a plurality of host computers even more effectively.

Although, in the above-described embodiment, the time counter W is used for measuring passing of time, the timer 11a of the CPU 11 can be used instead. Alternatively, the first and second host computers 1, 2 can further include an additional timer that starts measuring time upon receiving from the printer 10 a status signal indicating that the first copy is printed out. Then, when a predetermined time is passed, the first or the second host computer 1, 2 transmits a command to the printer 10 to proceed with the rest of the program.

In the above-described embodiment, only when the variable N is equal to or greater than two, the program proceeds to S21. However, even when the variable N is set to one, that is, when the user intends to print out only one copy of a document, the print data may be retained in the page memory 15c by executing the process in S15 right before the process in S9 and executing S21 and on when S15 results in a negative determination. In this case, the process in S15 is executed for the first time, the value of the copy counter must be equal to zero. Therefore, S15 will result in a negative determination so the program proceeds to S17. When the variable N is equal to or greater than two, the rest of N copies can be printed out in the same manner as in the above-described embodiment. When the user wants to increase or decrease the number of copies to be printed, the user can do so by operating the other numeral keys provided to the key panel 27 of the printer 10 to change the variable N. When the user operates the numeral key to change the variable N, next copies can be automatically started without the user pressing the continue key 27a.

Figure 7:
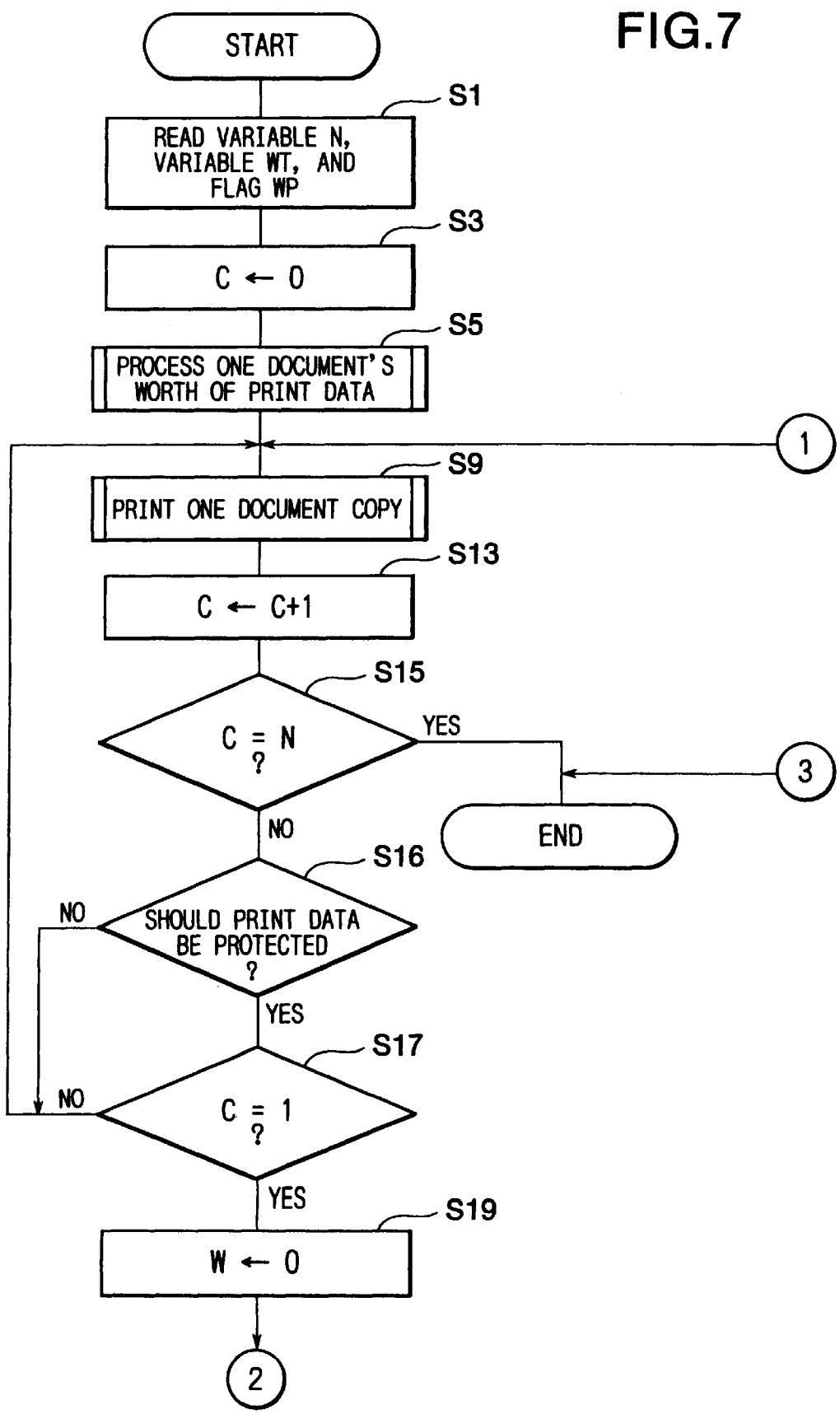
FIG. 7 is a flowchart representing a main routine according to a modification of the embodiment of the present invention.

In the above-described embodiment, when the variable N is set to equal or greater than 2, the program proceeds to S21 to execute the first loop process after a first copy is printed out. However, the main routine can further include an additional process for determining whether or not the program should proceed to S21. Detail description of a main routine according to a modification of the above-described embodiment will be provided next while referring to the flowchart shown in FIG. 7. As shown in FIG. 7, an additional process S16 is executed right before S17 so as to determine whether or not the print data should be retained. Detailed description of the determination process in S16 will be provided later. If it is determined that the print data should be retained (S16:YES), the program proceeds to S21 via S17 and S19. On the other hand, if it is determined that it is unnecessary to retain the print data (S16:NO), the program proceeds to S9 wherein the rest of the copies are printed out, and the program is ended. In this case, because when S16 results in a negative determination (S16:NO), the rest of the copies are automatically printed out, the user may not wish to set the variable N to a large number. However, because the print data will not be erased from the page memory 15c until replaced by other print data, if the control unit includes the above-described reprint function, copies of the document can be repeatedly printed out as long as the print data is stored in the page memory 15c.

Next, the determination process in S16 will be described. The determination process is set differently in accordance with an application software used in the first and the second host computers 1, 2. Three different processes will be described as examples of the determination process. In a first example, when the user wishes to have time to examine a document before all of copies are printed out, the user inputs a command for retaining print data. The command is transmitted to the printer 10 with the print data. Then, it is determined whether or not the command accompanies print data. Only if the command is with the print data, it will be determined that the print data needs to be retained, and the program proceeds to S21. The variable WT indicating the waiting time duration can be used as the command. In a second example, the user inputs a command for not retaining print data when the user does not need time to examine the document. The command is transmitted to the printer with the print data. Then, it is determined whether or not the command accompanies the print data. The program will proceeds to S21 only when the command is not detected. In a third example, the user operates the key panel 27 of the printer 10 to make a setting of the printer 10 either to retain or not to retain print data. In this case, it is determined whether or not the print data should be retained based on the set made by the user.

In the above-described first and second examples, the commands and the print data can be transmitted to the printer 10 simultaneously or separately. However, it is preferable to transmit the commands simultaneously with the print data so as to prevent different print data from interrupting the current process. In this way, the print data can be further reliably prevented from being undesirably erased by being replaced by the other print data.

However, when the command and the print data are transmitted separately, the command needs to be transmitted only once. When the printer 10 receives the command, the setting is made either to retain or not to retain the print data based on the command, and the setting will be kept unchanged. In this way, because the command does not need to be transmitted repeatedly, a process of transmitting data between the computer 20 and the printer 10 can be simplified.

Also, because in the third example once the user made the setting of the printer 10, the setting will be kept unchanged unless the user makes a different setting, the setting can be made in a simple manner. If the user needs to input the command each time the user transmits different print data, the user may be forget to input the command. Also, the CPU 11 may fail to detect the command. However, these problems will not be caused in the second example and in the third example. Because the print data will be retained without requiring the user to re-input a command for retaining the print data or to re-set the status of the printer 10, the print data can be further reliably prevented from being erased undesirably.

In the third example described above, once it is set to retain print data, the setting can be kept unchanged until the user inputs a command to change the setting. However, a predetermined default setting can be made, and the current setting can be made applicable only for the current print data. Then, after the processes on the current print data are completed, setting can be returned to the default setting. Further, even when the setting made on the key panel 27 is to be kept unchanged, different settings can be temporally set only for specific print data. For example, even when setting on the key panel 27 indicates to retain print data, print data may be accompanied with a command for not retaining the print data, that is, the flag may be set to zero. In this case, the setting of the flag is given a priority over the setting. Then, the print, data will not be retained. On the other hand, even when the setting indicates not to retain print data, print data may be accompanied with a command for retaining the print data, that is, a predetermined value is set to one. In this case, the print data will be retained at least for the predetermined waiting time.

A command accompanying print data is unnecessarily given the priority over setting made on the key panel 27. However, the key panel 27 can further include an additional setting key. Then, only when the additional setting key is pressed by the user, the command of the print data can be given the priority over the setting on the key panel 27.

Further, the flag WP need not be used. Instead of using the flag WP, the program can either proceed to S9 or be ended automatically if S29 results in an affirmative determination. Also, the printer 10 can include an ink jet printer engine or a thermal head printer engine rather than the laser printer engine.

Also, the print system 100 can include a peer-to-peer style LAN without a server. Specifically, the print system can includes a first computer, a second computer, and a printer connected to the second computer. The first computer can use the printer by transmitting print data to the printer via the second computer.

What is claimed is:

1. An image forming device communicable with an external device, comprising:
   a memory that stores image data transmitted from an external device;
   image forming means for forming an image on a recording medium based on the image data stored in memory so as to provide at least one copy of a document;
   first control means for prohibiting the memory from erasing the image data; and
   second control means for allowing the memory to erase the image data, wherein the first control means prohibits the memory from erasing the image data until the second control means allows the memoir to erase the image data.

2. The image forming device according to claim 1, wherein the first control means prohibits the memory from erasing the image data based on first command data transmitted from an external device.

3. The image forming device according to claim 2, wherein the first command data is transmitted from the external device along with the image data.

4. The image forming device according to claim 3, wherein the first control means prohibits the memory from erasing the image data except when the image data is transmitted with second command data indicating that the first control means should not prohibit the memory from erasing the image data.

5. The image forming device according to claim 3, wherein the first control means prohibits the memory from erasing the image data when the image data is transmitted without the first command data.

6. The image forming device according to claim 1, further comprising an input unit through which the user inputs a next command, wherein after the image forming means has provided a first one of a plurality of copies of the document, the image forming means provides remaining ones of the plurality of copies when the next command is input by the user.

7. The image forming device according to claim 6, the second control means allows the memory to erase the image data when a predetermined time duration elapses after the image forming means has provided the first one of the plurality of copies.

8. The image forming device according to claim 7, wherein the second control means allows the memory to erase the image data after the image forming means has provided the remaining ones of the plurality of copies.

9. The image forming device according to claim 6, further comprising third control means for controlling the image forming means to provide the remaining ones of the plurality of copies when a predetermined time duration elapses before the next command is input by the user after the image forming means has provided the first one of the plurality of copies.

10. The image forming device according to claim 9, further comprising selecting means for selecting one of the second control means and the third control means, wherein when the second control means is selected, the second control means allows the memory to erase the image data when the predetermined time duration elapses before the next command is input by the user after the first one of the plurality of copies has been provided, and when the third control means is selected, the third control means controls the image forming means to provide the remaining ones of the plurality of copies when the predetermined time duration elapses before the next command is input by the user after the first one of the plurality of copies has been provided.

11. An image forming device communicable with an external device, comprising:
   a memory that stores image data transmitted from an external device;
   image forming means for forming an image based on the image data stored in the memory to provide at least one copy of a document;
   first control means for prohibiting the memory from erasing the image data;
   second control means for allowing the memory to erase the image data; and
   an input unit through which a user inputs a next command, wherein
   after the image forming means has provided a first one of a plurality of copies of the document, the image forming means provides remaining ones of the plurality of copies when the next command is input by the user, and the second control means allows the memory to erase the image data when the image forming means provides the remaining ones of the plurality of copies.

12. The image forming device according to claim 11, further comprising third control means for controlling the image forming means to provide the remaining ones of the plurality of copies when a predetermined time duration elapses before the next command is input after the image forming means has provided the first one of the plurality of copies.

13. The image forming device according to claim 12, further comprising selecting means for selecting one of the second control means and the third control means, wherein when the second control means is selected, the memory is allowed to erase the image data when the predetermined time duration elapses before the next command is input after the image forming means has provided the first one of the plurality of copies, and when the third control means is selected, the image forming means provides the remaining ones of the plurality of copies when the predetermined time duration elapses before the next command is input after the image forming means has provided the first one of the plurality of copies.

14. The image forming device according to claim 11, wherein the user further inputs a stop command through the input unit, and wherein when the user inputs the stop command after the image forming means provides the first one of the plurality of copies before the predetermined time duration elapses, the first control means prohibits the memory from erasing the image data until the user inputs the next command regardless of whether the predetermined time duration elapses.

15. The image forming device according to claim 13, wherein the image data is transmitted from the external device along with a header including a first variable, a second variable, and a selection flag, the first variable indicating how many copies of the document the image forming means should provide, the second variable indicating the predetermined time duration, and the selecting means selecting one of the first control means and the third control means based on the selection flag.

16. An image forming device communicable with an external device, comprising:
   image forming means for forming an image on a recording medium based on image data received from an external device so as to provide a plurality of copies of a document;
   first output control means responsive to an output command received from the external device for controlling the image forming means to provide a first one of the plurality of copies of the document;

an input unit through which a user inputs a further output command after the image forming means has provided the first one of the plurality of copies of the document; and second output control means responsive to the further output command input from the input unit for controlling the image forming means to provide remaining ones of the plurality of copies of the document when the further output command is input through the input unit.

17. The image forming device according to claim 16, wherein when a predetermined time duration elapses before the further output command is input after the image forming means has provided the first one of the plurality of copies of the document, the second output control means controls the image forming means to provide the remaining ones of the plurality of copies of the document.

18. The image forming device according to claim 16, wherein when a predetermined time duration elapses before the further output command is input after the image forming means has provided the first one of the plurality of copies of the document, the second output control means controls the image forming means not to provide the remaining ones of the plurality of copies of the document.

19. The image forming device according to claim 16, wherein the second output control means controls the image forming means not to provide the remaining ones of the plurality of copies of the document when a cancel command is input through the input unit after the image forming means has provided the first one of the plurality of copies of the document.

* * * * *

UNITED STATES PATENT AND TRADEMARK OFFICE
CERTIFICATE OF CORRECTION

PATENT NO.       : 6,198,541 B1
APPLICATION NO. : 09/192281
DATED            : March 6, 2001
INVENTOR(S)      : Satoshi Okimoto It is certified that error appears in the above-identified patent and that said Letters Patent is hereby corrected as shown below:

Claim 1, Column 11, Line 13, insert --even after the image forming means has provided a first one of a plurality of copies of the document-- after "the image data";
Claim 11, Column 12, Line 14, insert --even-- at the beginning of the line, before "after the image";
Claim 11, Column 12, Line 15, insert --the first control means prohibits the memory from erasing the image data until the second control means allows the memory to erase the image data,-- after "the document,"

Signed and Sealed this

Twenty-ninth Day of August, 2006

JON W. DUDAS
*Director of the United States Patent and Trademark Office*